Nov. 21, 1939. W. O. SIMPSON 2,180,773
NUT LOCK
Filed March 11, 1938

INVENTOR:
WILLIAM OLINDO SIMPSON,
by Carl A. Hellmann,
ATTORNEY.

Patented Nov. 21, 1939

2,180,773

UNITED STATES PATENT OFFICE 2,180,773

NUT LOCK

William Olindo Simpson, Mexico City, D. F., Mexico

Application March 11, 1938, Serial No. 195,376

2 Claims. (Cl. 151—33)

The invention relates to certain improvements in the nut locks securing the fish plates or joint bars to the rail joints, disclosed in the present inventor's prior U. S. Patent No. 1,959,741, according to which the face of the nut adjoining the fish plate or joint bar is provided with a cylindrical part which on tightening the nut on the bolt, is pressed with its outer surface against a bearing surface provided in the fish plate and which is frictionally engaged by the periphery of the cylindrical part of the nut.

The invention has for its object to provide means to compensate wear in manufacture on the cylindrical part of the nut on frictionally engaging the hole or recess in the fish plate, by making said hole or recess slightly inclined and not parallel to the axis of the nut and bolt.

It is another object of the invention to provide a nut lock in which the contact face of the nut itself is brought to bear first with one of its edges against the fish plate or joint bar and engages it frictionally, this result being obtained either by using a slightly curved or bent bolt, or by employing a nut with the contact face slightly inclined. A still further object of the invention consists in combining the inclined nut as heretofore described, with a cylindrical portion on the nut frictionally engaging in a straight or inclined hole or recess in the fish plate, whereby the nut is doubly locked both by the edge of the nut engaging the face of the fish plate and its cylindrical portion engaging the wall of the hole or recess in the fish plate. Still another object of the invention consists in giving to the contacting edge of the inclined nut a rough or serrated surface for still more firmly engaging and gripping the bearing surface of the fish plate.

Figure 1:
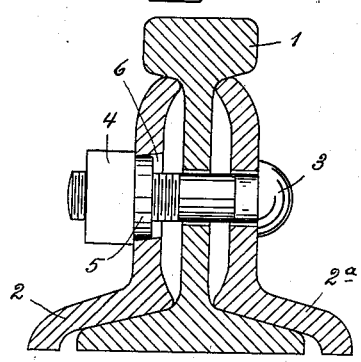
Figure 1 is a sectional view of a rail and fish plates with the cylindrical portion of the nut engaging an inclined hole of the corresponding fish plate.

In the drawing, 1 is the rail and 2 and 2ª are the fish plates or joint bars holding the rail ends together and attached to the latter by the bolt 3. The fish plates or joint bars may be of any of the known types.

Figure 2:
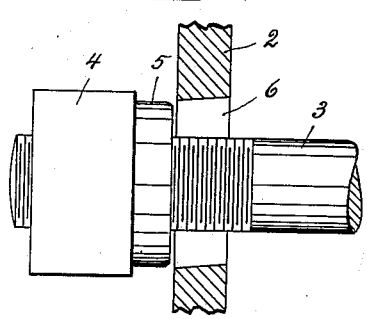
Figure 2 shows on an enlarged scale a section of the fish plate with the inclined hole and part of the bolt with its nut.

Figures 1 and 2 show a lock making use of a nut 4 having a cylindrical portion 5 projecting from its side bearing against the fish plate 2, as described in the present inventor's prior U. S. Patent No. 1,959,741. The novel feature of the invention consists in that the said cylindrical portion 5 engages in a slightly inclined hole 6 in the fish plate 2, in order to compensate for any accidental slight undersize produced during the manufacture of the nut or the wear produced by friction on said cylindrical portion on screwing it into a cylindrical hole with its axis coincident with the axes of the bolt and nut as disclosed in his prior patent. The inclined hole 6, the inclination of which is shown on an exaggerated scale in Figures 1 and 2, a small fraction of an inch of inclination being sufficient for the purpose, presents an inclined surface to a part of the periphery of the cylindrical portion 5 of the nut, which inclined surface grips said cylindrical portion more tightly the farther this portion enters the hole 6. Such an inclined hole may easily be punched in a fish plate by placing the latter on a correspondingly inclined surface during punching.

Figure 8:
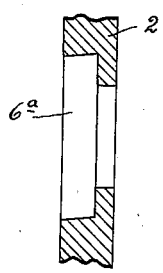
Figure 8 is a sectional view of part of a fish plate having a recess with inclined inner peripheral surface.

Instead of providing an inclined hole 6 passing entirely through the fish plate, a recess 6ª having inclined sides (Figure 8) and substantially coaxial with the hole for the bolt may be used, the depth of this recess being sufficient to receive the cylindrical portion 5.

Figure 3:
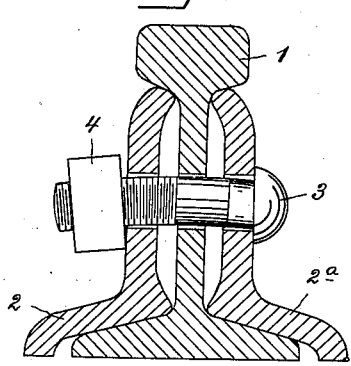
Figure 3 is another sectional view of the rail and fish plates, with a slightly curved bolt producing the inclination of the nut.
Figure 4:
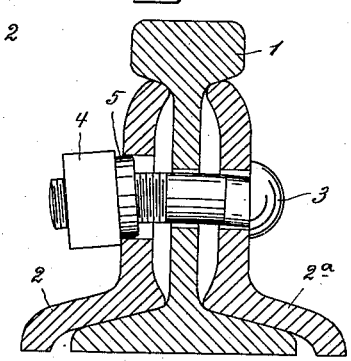
Figure 4 is a view similar to Figure 3, with a curved bolt and a nut having a cylindrical portion.

Figures 3 and 4 illustrate a lock in which use is made of a slightly curved bolt 3 forcing the nut 4 to take an inclined position so as to bear against the outer face of the fish plate 2 at an acute angle. One edge of the contact surface of the nut is thereby brought into contact with the fish plate first, and the friction thus produced between the contacting surfaces is sufficient to lock the nut securely. The locking effect may further be increased by providing on the nut 4 a cylindrical portion 5 engaging a straight (that is, perpendicular to the surface) hole or recess in the fish plate 2, as the cylindrical portion of the nut frictionally engaging said hole or recess being in an inclined position produces the same locking effect as the cylindrical portion 5 in Figures 1 and 2 engaging the inclined hole 6. The curvature of the bolt in Figures 3 and 4 is shown exaggerated in the drawing, as a much smaller curvature will produce the effect described.

Figure 5:
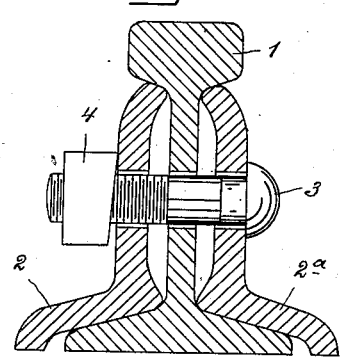
Figure 5 is also a sectional view of the rail and fish plates, with a bolt and a nut having its contact face inclined.
Figure 7:
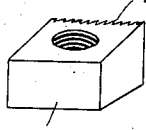
Figure 7 is a perspective view of the nut shown in Figure 5, having its contacting edge serrated.
Figure 6:
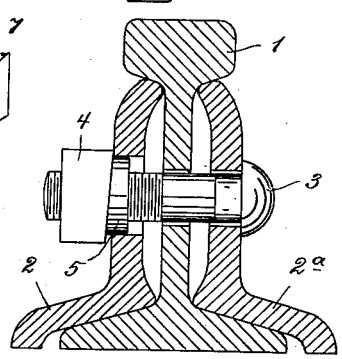
Figure 6 is a view similar to Figure 5, with the inclined nut having a cylindrical portion engaging the fish plate.

Finally, Figures 5 and 6 show a lock in which the bolt 3 is straight but the nut 4 has its contact face slightly inclined. This will make one edge of said nut grip the surface of the fish plate first when the nut is threaded on the bolt. This nut may also bear a cylindrical portion 5 which may engage either a straight hole or recess as shown in Figure 6, or an inclined hole or recess as described with reference to Figures 1 and 2. The contacting edges of all nuts striking the fish plate at an angle, may be roughened or serrated, as shown in Figure 7 at edge 7, the teeth being preferably cut in such a direction that they slide along the wall of the fish plate while the nut is being tightened but cut into said wall when the nut tends to loosen. Although in the drawing square nuts have been illustrated, it is obviously possible to use hexagonal nuts for the purpose described.

It will be noted that the projecting cylindrical part 5 of the nut has a wall of such thickness as to be non-distortable by the force exerted by the wrench when the nut is applied.

While the invention has been shown in the drawing as particularly applied to fish plates, it should be understood that the same nut lock may also be used with any other equipment or appliances.

What I claim is:

1. A railroad track lock nut comprising, in combination, a fish plate having an opening extending therethrough, said opening being of uniform bore throughout its entire extent, a bolt extending through said opening, the axes of the opening and the bolt being initially angularly out of alinement, a nut threaded upon the bolt, said nut having a non-distortable cylindrical portion integral therewith and coaxial with the bolt, said cylindrical portion being of proper diameter to fit within the opening in the fish plate, and to bear frictionally with its outer surface against the peripheral surface of said opening, whereby tightening the nut, by screwing it along the bolt, will cause the surface of the said cylindrical portion of the nut to produce alinement of the axis of the nut with the axis of the holes, thereby flexurally stressing the bolt and thus generating a force which will cause the said cylindrical portion to bind against the inner wall of the hole.

2. A railroad track lock nut comprising, in combination, a fish plate having an opening extending therethrough, said opening being of uniform bore throughout its entire extent, a bolt extending through said opening, a nut threaded upon the bolt, said nut having an integral non-distortable cylindrical portion coaxial with the bolt, and having another portion adjacent thereto, with a substantially plane flange extending outwardly beyond the diameter of the cylindrical portion, said cylindrical portion being of proper diameter to fit within the opening in the fish plate, and to bear frictionally against the peripheral surface of said opening, whereby tightening the nut, by screwing it along the bolt, will cause the cylindrical portion to enter the hole, until the said flange contacts the fish plate, said flange being disposed at an angle differing from a right angle with respect to the axis of the hole, whereby further tightening of the nut will cause the outer surface of the cylindrical portion to bind against the peripheral surface of the hole.

WILLIAM OLINDO SIMPSON.